United States Patent [19]

Okura et al.

[11] 4,099,502
[45] Jul. 11, 1978

[54] MANIFOLD ASSEMBLY FOR INTERNAL COMBUSTION ENGINE

[75] Inventors: Takao Okura, Ooimachi; Eiichi Hashimoto, Niiza; Yasumichi Ohama, Mitaka, all of Japan

[73] Assignee: Honda Giken Kogyo Kabushiki Kaisha, Tokyo, Japan

[21] Appl. No.: 709,394

[22] Filed: Jul. 28, 1976

[30] Foreign Application Priority Data

Aug. 4, 1975 [JP] Japan ................... 50-94187
Aug. 4, 1975 [JP] Japan ................... 50-107120

[51] Int. Cl.² .............................. F02M 31/00
[52] U.S. Cl. ..................... 123/122 AC; 123/122 AB; 123/122 H
[58] Field of Search ............... 123/122 AB, 122 AC, 123/122 H; 261/144, 145

[56] References Cited
U.S. PATENT DOCUMENTS

| 2,395,264 | 2/1946 | Gardner | 123/122 H |
| 2,437,724 | 3/1948 | Brown | 123/122 H |
| 2,473,808 | 6/1949 | Mallory | 123/122 H |
| 2,725,862 | 12/1955 | Dolza | 123/122 H |
| 3,942,495 | 3/1976 | Kobayashi | 123/122 AC |

FOREIGN PATENT DOCUMENTS

2,404,112  1/1973  Fed. Rep. of Germany ....... 123/122 AC

*Primary Examiner*—Ronald H. Lazarus
*Attorney, Agent, or Firm*—Lyon & Lyon

[57] ABSTRACT

An intake manifold and an exhaust manifold, both for use with an internal combustion engine, are provided with a common wall for transmission of heat from the hot exhaust gases to the air-fuel mixture in the intake manifold. A movable baffle is provided for varying the amount of heat transfered to the air-fuel mixture, and the operation of this baffle is controlled by a first device responsive to ambient temperature outside said manifolds, and also by a second device responsive to the intensity of intake vacuum pressure. The baffle may be mounted in either manifold and may be mounted to swing or slide with respect to the stationary heat transmitting wall which separates the manifolds.

9 Claims, 7 Drawing Figures

MANIFOLD ASSEMBLY FOR INTERNAL COMBUSTION ENGINE

This invention relates to internal combustion engines and is particularly directed to improved means for controlling the heating of air-fuel mixture in the intake manifold from hot exhaust gases in the exhaust manifold.

It is highly desirable to insure complete vaporization of the air-fuel mixture delivered to the engine combustion chambers, and this has been previously accomplished by heat exchange devices which utilize a portion of the heat of the exhaust gases to heat the air-fuel mixture in the intake manifold. However, excessive heat may carbonize the fuel in the mixture as well as reducing volumetric efficiency, while insufficient heat may permit fuel droplets to reach the engine combustion chambers with consequent increase in pollutants discharged into the atmosphere with the exhaust gases.

It is an important object of this invention to provide apparatus for varying the amount of heat transfered to the incoming air-fuel mixture, such control being responsive to engine intake vacuum intensity as well as to ambient air temperature outside the manifolds.

Other and more detailed objects and advantages will appear hereinafter. In the drawings.

Figure 1:
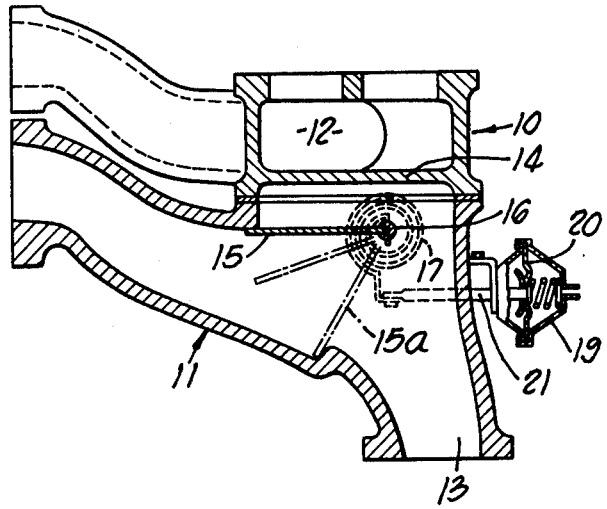
FIG. 1 is a sectional side elevation showing a preferred embodiment of this invention.

Referring to the drawings, an intake manifold 10 is secured to an exhaust manifold 11, both manifolds being intended for use with an internal combustion engine, not shown. An air-fuel mixture is admitted into the space 12 in the intake manifold 10 for combustion in the engine, and hot exhaust gases from the engine are delivered into the exhaust manifold 11 and pass out through the discharge opening 13. A stationary member 14 in the form of a plate separates the intake space 12 from the interior of the exhaust manifold 11, and this stationary member 14 acts to transfer heat from the exhaust manifold to heat the incoming air-fuel mixture in the space 12 within the intake manifold 10.

Figure 2:
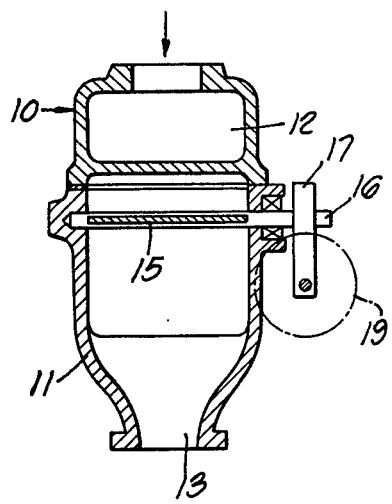
FIG. 2 is a sectional end elevation.
Figure 3:
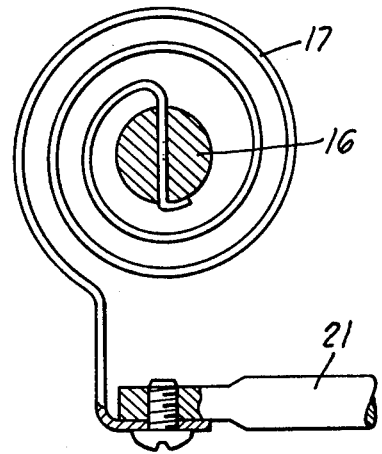
FIG. 3 is an enlarged detail of a portion of the apparatus shown in FIGS. 1 and 2.

In accordance with this invention, means are provided for varying the amount of heat transferred to the air-fuel mixture and, as shown in FIGS. 1-3 of the drawings, this means comprises a movable element 15 or baffle mounted within the exhaust manifold 11 and arranged to swing about the axis of the transverse shaft 16 to which it is attached. The movable baffle 15 has surfaces which are parallel to the axis of the shaft 16. The shaft 16 has a portion which projects outside the exhaust manifold 11, and to the projecting end of this shaft 16 there is secured a temperature responsive member 17 which may comprise a bimetal coil, or the device may be of the wax type, if desired. This member 17 responds to ambient air temperature outside said manifolds. A vacuum responsive device 19 is connected by means, not shown, to respond to intake vacuum pressure of the engine. This device includes a diaphragm 20 connected by rod 21 to the outer end of the temperature responsive device 17.

In operation, when the ambient air temperature is low and the internal combustion engine has not yet been warmed up, the temperature responsive device 17 causes the shaft 16 to swing the baffle 15 downward to the phantom line position shown at 15a in FIG. 1. Substantially all of the exhaust gases are then deflected against the stationary plate member 14 to increase the degree of heating of the air-fuel mixture passing through the space 12. The vacuum responsive device 19 acts to hold the baffle 15 in open position whenever the intake vacuum intensity is high, for example, when the engine is idling. When the intake vacuum intensity is low, for example, when the engine is operating under heavy load, the vacuum responsive device 19 acts to move the baffle 15 toward the closed position shown in full lines in FIG. 1. As the engine warms up, the temperature responsive device 17 also acts to move the baffle 15 toward the closed position. At heavy load operation of the engine, the baffle 15 is fully closed, thereby maintaining volumetric efficiency of the engine and preventing carbonizing of fuel through overheating of the air-fuel mixture. The proportions of the parts are such that the baffle 15 is held in its fully closed position by the temperature responsive device 17 when the ambient air temperature is high, even though the engine may be operating at light load, or idling.

Figure 4:
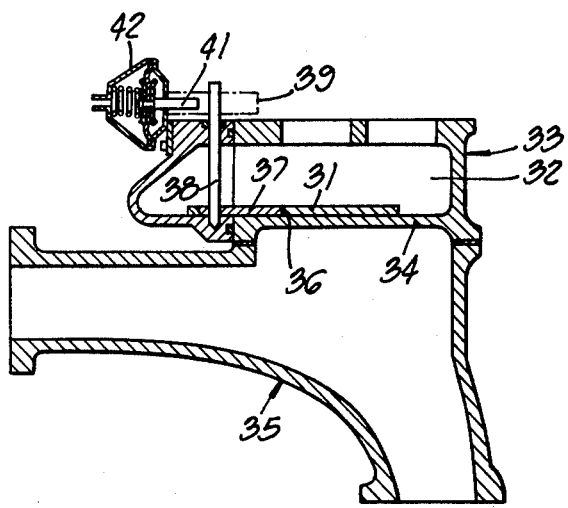
FIG. 4 is a sectional side elevation showing a modification.
Figure 5:
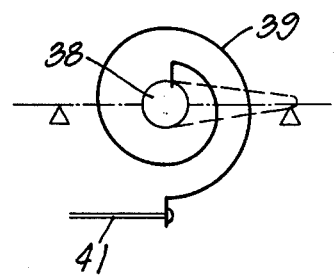
FIG. 5 is an enlarged plan view showing a portion of the device shown in FIGS. 4 and 6.
Figure 6:
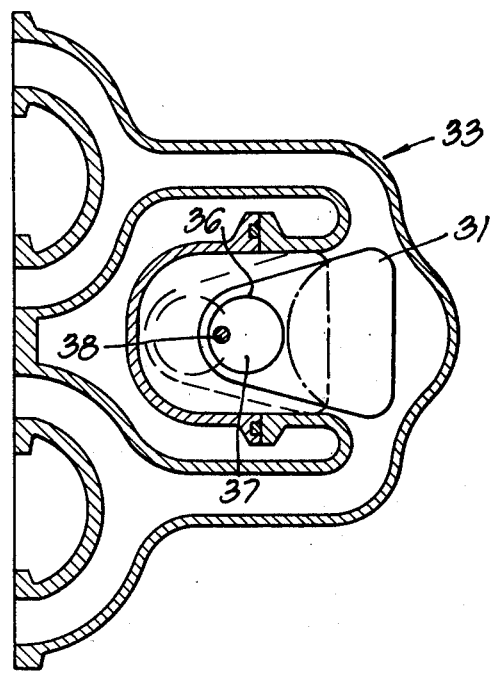
FIG. 6 is a sectional plan view.

In the manifold form of the invention shown in FIGS. 4, 5 and 6, the baffle 31 is mounted within the space 32 of the intake manifold 33. The baffle 31 has a plane surface which rests on the stationary heat transfer plate 34 which separates the space 32 from the interior of the exhaust manifold 35. A circular opening 36 in the baffle 31 receives an eccentric disk 37 which is fixed to the pivot shaft 38. The pivot shaft 38 extends at right angles to the plane of the baffle 31, and the upper end of the shaft 38 projects out of the intake manifold 33 and is connected to a temperature responsive device 39 which responds to ambient air temperature. The temperature responsive device 39 may comprise a bimetal coil, or, if desired, it may be of the wax type. The inner end of the coil is fixed to the pivot shaft 38 and the outer end is fixed to the actuating rod 41 of the vacuum responsive device 42.

In the operation of this form of the invention, the baffle 31 is caused to cover a greater or less proportion of the area of the heat transfer plate 34. Turning motion of the shaft 38 and the circular disk 37 fixed thereto causes the baffle 31 to move between the position shown in full lines and the position shown in phantom lines, in FIG. 6. Greater heating of the intake air-fuel mixture in space 32 occurs when the baffle 31 is retracted to the phantom line position. The temperature responsive device 39 and the vacuum responsive device 42 operate in the manner previously described.

Figure 7:
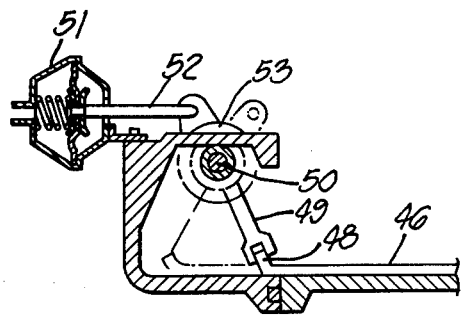
FIG. 7 is a sectional elevation showing another modification.

In the second modified form of the invention, shown diagrammatically in FIG. 7, the baffle 46 is mounted within the intake manifold and slides on the stationary heat transfer plate 47. A projection 48 on one end of the baffle 46 is received in a slot in the end of a pivoted arm 49 fixed to turn with the pivot shaft 50. A vacuum responsive device 51 acts through rod 52 to turn the outer end of a temperature responsive device 53. The shaft 50 is turned by the temperature responsive device 53 in the manner previously described. The principal difference between the device shown in FIG. 7 and the device shown in FIGS. 4–6 is that the swinging arm 49 is provided for moving the baffle 46 back and forth, instead of employing the eccentric circular disk 37. The operation of the device is substantially the same as that previously described.

Having fully described our invention, it is to be understood that we are not to be limited to the details herein set forth but that our invention is of the full scope of the appended claims.

We claim:

1. In a manifold assembly for an internal combustion engine having an intake manifold for delivering an air-fuel mixture for combustion in the engine and an exhaust manifold for receiving hot exhaust gases from the engine, the combination of: heat exchange means including a stationary heat transfer wall operatively positioned between said manifolds whereby the air-fuel mixture may be heated by the hot exhaust gases, a movable element mounted in said intake manifold in contact with said heat transfer wall, and means pivoting said movable element at right angles to said heat transfer wall so as to uncover and cover said heat transfer wall in order to increase and decrease the amount of heat transferred to the air-fuel mixture.

2. The combination set forth in claim 1 in which an eccentric circular disk is provided for moving said movable element.

3. The combination set forth in claim 1 in which means responsive to ambient temperature outside said manifolds are provided for moving said movable element with respect to said stationary wall.

4. The combination set forth in claim 1 in which means responsive to intake vacuum pressure of the engine are provided for moving said movable element with respect to said stationary wall.

5. The combination set forth in claim 1 in which means responsive to both intake vacuum pressure of the engine and to ambient temperature outside said manifolds are provided for moving said movable element.

6. In a manifold assembly for an internal combustion engine having an intake manifold for delivering an air-fuel mixture for combustion in the engine and an exhaust manifold for receiving hot exhaust gases from the engine, the combination of: heat exchange means including a stationary heat transfer wall operatively positioned between said manifolds whereby the air-fuel mixture may be heated by the hot exhaust gases, a movable element mounted in said intake manifold in contact with said heat transfer wall, and a swing arm having a pivoting axis which is spaced and parallel to said heat transfer wall and being operatively connected to said movable element, whereby said swing arm may cause said movable element to move slidably on said heat transfer wall back and forth so as to uncover and cover said heat transfer wall in order to increase and decrease the amount of heat transferred to the air-fuel mixture.

7. The combination set forth in claim 6 in which said movable element has a projection thereon and said swing arm has a slot for slidably receiving said projection.

8. In a manifold assembly for an internal combustion engine having an intake manifold for delivering an air-fuel mixture for combustion in the engine and an exhaust manifold for receiving hot exhaust gases from the engine, the combination of: heat exchange means including a stationary heat transfer wall operatively positioned between said manifolds whereby the air-fuel mixture may be heated by the hot exhaust gases, a movable plate, said heat transfer wall and said movable plate being in close proximity, substantially parallel, and substantially overlapping each other, and means for moving said movable plate parallel to said heat transfer wall to cause said plate to uncover and cover said heat transfer wall in order to increase and decrease the amount of heat transferred to the air-fuel mixture.

9. In a manifold assembly for an internal combustion engine having an intake manifold for delivering an air-fuel mixture for combustion in the engine and an exhaust manifold for receiving hot exhaust gases from the engine, the combination of: heat exchange means including a stationary heat transfer member operatively positioned between said manifolds whereby the air-fuel mixture may be heated by the hot exhaust gases, a movable element positioned adjacent substantially parallel to said member for varying the amount of heat transmitted to the air-fuel mixture, said movable element being movable parallel to said heat transfer member from first position in which the amount of heat transmitted to the air-fuel mixture is minimum to second position in which the amount of the heat is maximum, first means detecting ambient temperature outside said manifolds and being operatively connected to said movable element for moving it toward said first position in response to said temperature, second means detecting the intensity of intake vacuum pressure of the engine and being operatively connected to said movable element for moving it toward said second position in response to said vacuum intensity, said first means holding said movable element in said first position when said temperature is high regardless of said vacuum intensity, and said second means holding said movable element in said second position when said temperature is low and said vacuum intensity is high.

* * * * *

UNITED STATES PATENT AND TRADEMARK OFFICE
CERTIFICATE OF CORRECTION

PATENT NO. : 4,099,502
DATED : July 11, 1978
INVENTOR(S) : TAKAO OKURA et al

It is certified that error appears in the above-identified patent and that said Letters Patent are hereby corrected as shown below:

Claim 9, line 32, insert --and-- between "adjacent" and "substantially".

Signed and Sealed this

Twenty-eighth Day of November 1978

[SEAL]

Attest:

RUTH C. MASON
Attesting Officer

DONALD W. BANNER
Commissioner of Patents and Trademarks